United States Patent
Ziebart et al.

(10) Patent No.: US 11,325,646 B2
(45) Date of Patent: May 10, 2022

(54) METHOD FOR OPERATING A PARKING ASSISTANCE SYSTEM OF A MOTOR VEHICLE AND PARKING ASSISTANCE SYSTEM OF A MOTOR VEHICLE

(71) Applicant: Volkswagen Aktiengesellschaft, Wolfsburg (DE)

(72) Inventors: Sascha Ziebart, Calberlah (DE); Alexander Urban, Gifhorn (DE); Frank Schwitters, Königslutter (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 92 days.

(21) Appl. No.: 17/047,561

(22) PCT Filed: Apr. 12, 2019

(86) PCT No.: PCT/EP2019/059379
§ 371 (c)(1),
(2) Date: Oct. 14, 2020

(87) PCT Pub. No.: WO2019/201759
PCT Pub. Date: Oct. 24, 2019

(65) Prior Publication Data
US 2021/0046976 A1 Feb. 18, 2021

(30) Foreign Application Priority Data
Apr. 19, 2018 (DE) .......................... 102018205968.3

(51) Int. Cl.
*G08G 1/16* (2006.01)
*B62D 15/02* (2006.01)
(Continued)

(52) U.S. Cl.
CPC ........... *B62D 15/028* (2013.01); *B60W 30/06* (2013.01); *B62D 15/0285* (2013.01);
(Continued)

(58) Field of Classification Search
CPC B62D 15/028; B62D 15/0285; B62D 15/027; B60W 30/06; B60W 2554/80;
(Continued)

(56) References Cited

U.S. PATENT DOCUMENTS

2003/0150661 A1* 8/2003 Kataoka ............. B62D 15/0285
180/204
2005/0035879 A1* 2/2005 Gotzig .................. B60Q 9/006
340/932.2
(Continued)

FOREIGN PATENT DOCUMENTS

DE 102006036423 A1 2/2008
DE 102007049709 A1 4/2009
(Continued)

OTHER PUBLICATIONS

PCT/EP2019/059379. Int'l Search Report (dated Jul. 12, 2019).
DE12018205968.3. Office Action (dated Nov. 28, 2018).

*Primary Examiner* — Munear T Akki
(74) *Attorney, Agent, or Firm* — Loza & Loza, LLP; Peter Zura

(57) ABSTRACT

A parking assistance system for a motor vehicle. A parking-space searching drive is performed where longitudinal and transverse guidance is determined, while a detection device determines a vehicle environment. Parking spaces may be measured on the basis of the detected vehicle environment. Based on the parking space measurement, it is determined if a parking space is suitable for the vehicle.

20 Claims, 1 Drawing Sheet

(51) Int. Cl.
  *B60W 30/06* (2006.01)
  *G06V 20/58* (2022.01)
(52) U.S. Cl.
  CPC ............ *G06V 20/58* (2022.01); *G06V 20/586* (2022.01); *G08G 1/168* (2013.01); *B60W 2554/80* (2020.02); *B60W 2556/45* (2020.02)
(58) Field of Classification Search
  CPC . B60W 2556/45; G06V 20/58; G06V 20/586; G08G 1/168
  See application file for complete search history.

(56) References Cited

U.S. PATENT DOCUMENTS

| | | | |
|---|---|---|---|
| 2009/0085771 A1* | 4/2009 | Wu | B62D 15/0285 |
| | | | 348/148 |
| 2010/0152972 A1* | 6/2010 | Attard | G08G 1/165 |
| | | | 701/44 |
| 2011/0057813 A1* | 3/2011 | Toledo | B60W 10/20 |
| | | | 340/425.5 |
| 2011/0251755 A1* | 10/2011 | Widmann | B62D 15/027 |
| | | | 701/36 |
| 2012/0072067 A1* | 3/2012 | Jecker | B62D 15/0285 |
| | | | 701/25 |
| 2015/0302750 A1* | 10/2015 | Choi | G08G 1/141 |
| | | | 340/932.2 |
| 2017/0123421 A1* | 5/2017 | Kentley | G06Q 10/00 |
| 2018/0308358 A1* | 10/2018 | Hayakawa | B62D 15/027 |
| 2018/0308359 A1* | 10/2018 | Hayakawa | G09B 29/10 |
| 2018/0315312 A1* | 11/2018 | Hayakawa | G08G 1/143 |
| 2018/0322349 A1* | 11/2018 | Hayakawa | B62D 15/027 |
| 2019/0009773 A1* | 1/2019 | Miyahara | B62D 15/028 |
| 2020/0189569 A1* | 6/2020 | Awan | H04W 4/80 |
| 2020/0282975 A1* | 9/2020 | Minase | B62D 15/0285 |
| 2020/0298835 A1* | 9/2020 | Suzuki | G05D 1/0225 |

FOREIGN PATENT DOCUMENTS

| | | |
|---|---|---|
| DE | 102009046731 A1 | 5/2011 |
| DE | 102010030144 A1 | 12/2011 |
| DE | 102010041108 A1 | 3/2012 |
| DE | 102010042048 A1 | 4/2012 |
| DE | 102010062322 A1 | 6/2012 |
| DE | 102012203235 A1 | 9/2013 |
| DE | 102014220298 A1 | 4/2016 |
| DE | 102014224075 A1 | 6/2016 |
| DE | 102016117712 A1 | 3/2018 |
| EP | 2982564 A2 | 2/2016 |
| WO | 11029692 A1 | 3/2011 |

* cited by examiner

METHOD FOR OPERATING A PARKING ASSISTANCE SYSTEM OF A MOTOR VEHICLE AND PARKING ASSISTANCE SYSTEM OF A MOTOR VEHICLE

RELATED APPLICATIONS

The present application claims priority to International Patent App. No. PCT/EP2019/059379 to Sascha Ziebart et al., filed Apr. 12, 2019, which further claims priority to German Pat. App. No. 102018205968.3 filed Apr. 19, 2018, each the contents being incorporated by reference in their entirety herein.

BACKGROUND

The present disclosure relates technologies and techniques for operating a parking assistance system in a motor vehicle and a parking assistance system for a motor vehicle. The present disclosure also relates to a motor vehicle that has such a parking assistance system.

Parking assistance systems are known that can assume longitudinal and transverse control of a motor vehicle to automatically maneuver the motor vehicle in question into a parking space. These types of parking systems are described, for example, in DE 10 2010 042 048 A1, DE 10 2010 062 322 A1 and DE 10 2010 030 144 A1.

DE 10 2016 117 712 A1 discloses a method for parking a motor vehicle. Objects are detected in a vehicle's environment using a sensor system in the vehicle, and a parking trajectory is determined for the motor vehicle on the basis thereof. The parking procedure along the determined trajectory is at least semi-autonomous. If a previously unidentified object is detected during the parking procedure, the object is monitored for further movement. As soon as the object leaves the detection range of the sensor system, the motor vehicle is moved to a detection position from which the sensor system can again detect this object.

These parking assistance systems are first activated when a parking space has been found and fully surveyed. In order to find and survey suitable parking spaces, a driver normally searches for such spaces. In the course of this search, sensors in the motor vehicle scan the vehicle's environment, by means of which any available parking spaces can then be surveyed.

An aspect of the present disclosure is to create technologies and techniques for a motor vehicle to reliably find and survey appropriate parking spaces.

BRIEF SUMMARY

Various technologies and techniques for operating a parking assistance system in a motor vehicle according to the present disclosure may include the steps of searching for a parking space by using a parking assistance system, wherein the parking assistance system assumes longitudinal and transverse control of the motor vehicle taking at least one property of a detection device in the motor vehicle into account, which is configured to scan a vehicle environment; scanning the vehicle environment while searching for a parking space with the detection device; surveying parking spaces with the parking assistance system on the basis of the detected vehicle environment; and determining whether a parking space suitable for the motor vehicle has been detected on the basis of the surveyed parking spaces.

According to the present disclosure, the parking assistance system may assume longitudinal and transverse control of the motor vehicle while the motor vehicle searches for a parking space. The present disclosure acknowledges that when drivers of motor vehicles normally search for parking spaces, these parking spaces are frequently surveyed under less than ideal conditions. By way of example, a driver may drive very close, or at a greater distance, to the automobiles parked on the side of a road. The driver normally does not know what properties a detection device in the motor vehicle that is configured to scan a vehicle environment has. By way of example, radar sensors, ultrasonic sensors, or cameras can be used for such functions. Because the driver normally does not know the range in which the respective sensors can deliver reliable results for surveying and identifying suitable parking spaces, it may be difficult for the driver to manually maneuver the motor vehicle such that the relevant sensors can consistently deliver reliable results, based on which it can be determined whether a specific parking space is actually suitable for parking the relevant motor vehicle. If the motor vehicle is then parked autonomously, this may result in a poor parking of the vehicle, or it may be the case that the position of vehicle must be retroactively corrected—automatically or manually—which may be undesirable.

The survey results of the search for a parking space and the survey of the parking space may also be compromised because the driver does not know the properties of the sensor system used for surveying parking spaces, and does not take these properties into account when searching for a parking space.

In this regard, the solution proposed by the present disclosure ensures that the parking assistance system itself actually searches for the parking space, this being such that it takes at least one property of a detection device in the motor vehicle that is configured to detect a vehicle's environment into account. The parking assistance system controls the motor vehicle during the automatic search for a parking space such that the best possible detection results, and thus for the search for the parking space and the survey of the parking space, can be obtained with the detection device during the scanning of the vehicle's environment.

BRIEF DESCRIPTION OF THE DRAWINGS

Further advantages, features and details of the present disclosure can be derived from the following description of preferred exemplary embodiments, and based on the drawings. The features and combinations of features specified above in the description and the features and combinations of features specified below in the description of the figures and/or shown only in the figures can be used not only in the respective given combination, but also in other combinations or in and of themselves, without abandoning the scope of the present disclosure.

Identical elements, or elements with the same function, have the same reference symbols in the figures.

DETAILED DESCRIPTION

Figure 1:
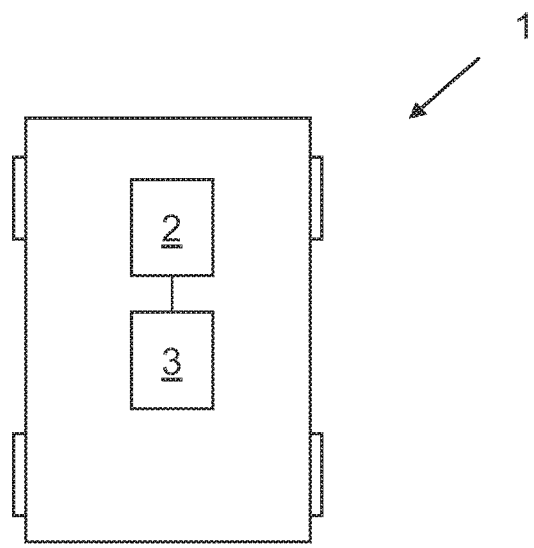
FIG. 1 shows an exemplary schematic illustration of a motor vehicle that has a detection device for scanning a vehicle environment, and a parking assistance system that is configured to automatically search for a parking space.

In some examples, the present disclosure illustrates technologies and techniques for ensuring that a detection device in a motor vehicle designed for scanning a vehicle's environment can reliably detect and survey potential parking spaces during the search, such that the parking assistance system can particularly reliably obtain very good measurement results, or detection results regarding whether a suitable parking space has been found for the motor vehicle. In other words, an optimal survey of suitable parking spaces can be obtained with the sensor system available in the form of a detection device in the motor vehicle, consequently improving the parking result when parking the motor vehicle—regardless of whether the parking procedure is automatic, using the parking assistance system, or manual. In addition, the driver of the relevant vehicle can pay particularly close attention to the environment during the search for a parking space, because it is not necessary for the driver to assume longitudinal and transverse control of the motor vehicle itself for the detection device to deliver good results in the search for a parking space. This also prevents minor collisions with parked automobiles during the search.

In some examples, a longitudinal and transverse control of the motor vehicle may be based on a detection range of the detection device. Data is provided to the parking assistance system for this that characterizes the detection range of the detection device. If, for example, numerous sensors in the detection device that are distributed over the body of the motor vehicle are used to scan the vehicle's environment when searching for a parking space, the parking assistance system can decide, based on the respective detection ranges of the sensors, and thus the overall detection range of the detection device, how best to steer the motor vehicle when searching for a parking space in order to reliably detect and survey potential parking spaces. As such, the ranges of the sensors at the side, front, and/or back of the motor vehicle can be taken into account. When the ranges are known, the longitudinal and transverse control of the vehicle can be such that parking spaces that are to be detected and surveyed, and objects adjacent thereto—for example, other vehicles or obstacles—lie within the ranges of the respective sensors.

In some examples, the longitudinal and transverse control of the motor vehicle may be configured such that a predefined maximum distance to other vehicles and/or obstacles, based on the detection range, is not exceeded. The available sensors in the detection device may have different ranges, within which useful measurement results can be obtained in the search for a parking space. If the maximum distance to other vehicles and/or obstacles is exceeded, these sensors no longer provide useful results in the search for a parking space. A maximum distance to other objects, for example, vehicles and/or obstacles, may be predefined on the basis of the detection range, wherein the longitudinal and transverse control of the motor vehicle by the parking assistance system ensures that this maximum predefined distance to other vehicles and/or obstacles is not exceeded during the search for a parking space. This ensures that the relevant sensors in the detection device can deliver good and meaningful results during the search for a parking space.

In some examples, the longitudinal and transverse control of the motor vehicle is such that a predefined minimum distance to other vehicles and/or obstacles determined on the basis of the detection range is maintained. It may also be the case with some sensors that if the predefined minimum distance is not maintained, meaningful measurement results can no longer be obtained in the search for a parking space. If cameras are used for environment detection, for example, it may be the case that if they come closer to other objects than the minimum distance, the camera can no longer deliver images that are in focus, and that could be used for detecting and surveying suitable parking spaces. It may also be the case in some examples that ultrasonic sensors and lidar sensors no longer deliver meaningful results when they are closer than a minimum distance typical for these sensors, that would enable a detecting and/or surveying of a parking space. This minimum distance is therefore predefined on the basis of the detection range of the detection device, wherein the longitudinal and transverse control of the motor vehicle by the parking assistance system is such that this predefined minimum distance to other objects, for example, other vehicles and/or obstacles, is maintained during the search for a parking space.

In some examples, the longitudinal and transverse control of the motor vehicle may be configured such that the detection device has an optimal field of vision for detecting the parking spaces that are to be surveyed. Information or data can be provided for this regarding the types of sensors installed at different positions on the motor vehicle that are used for scanning the vehicle's environment. If cameras installed in the lower parts of side mirrors are used, for example, for scanning the environment during the search for a parking space, information or data can be provided that characterizes the perspective from which these cameras can actually detect the vehicle's environment. The longitudinal and transverse control of the motor vehicle can then be based on this information, such that the optimal field of vision can be ensured for the relevant cameras. With other sensors, for example, radar sensors or ultrasonic sensors, data or information can be provided that characterize the positioning of the relevant sensors and radiation characteristics of ultrasound signals or radar signals. The longitudinal and transverse control of the motor vehicle with this information can be such that the optimal field of vision can be ensured in the form of a detection field during the search for a parking space with regard to objects that are to be detected.

In some examples, other vehicles and/or obstacles may be detected in the scanned vehicle environment, and the motor vehicle is then steered around the detected vehicle and/or obstacle. In other words, the parking assistance system does not only take the properties of the detection device in the motor vehicle into account when searching for a parking space. It also may detect and take obstacles such as other vehicles or stationary obstacles into account during the search for a parking space, such that the parking assistance system steers the motor vehicle around these obstacles. It may be the case, for example, that another motor vehicle is just leaving its parking space during the search for a parking space. The detection device in the motor vehicle can then detect the change in position of the leaving vehicle, and send data in this regard to the parking assistance system. This then controls the motor vehicle while the other vehicle is leaving such that it remains stationary, for example, until the other vehicle has left the parking space, or it undertakes an avoidance maneuver. It is therefore possible to reliably avoid collisions by the motor vehicle with other objects, for example, other vehicles or other obstacles, during the search for a parking space.

In some examples, the vehicle's environment may be scanned with at least one camera, ultrasonic sensor and/or radar sensor in the detection device. This ensures a particularly good detection of the vehicle's environment in order to provide data regarding the search for a parking space that characterizes the vehicle's environment.

In some examples, the parking assistance system only searches for a parking space if there is a person who can take control of the motor vehicle. The hands of a driver may be monitored to see if they are on the steering wheel, such that the driver assistance system can assume control if this is not the case. There may be other mechanisms configured to determine whether a driver is currently able to assume control of the motor vehicle. It is also conceivable for a user of the motor vehicle to be outside the motor vehicle, at which point it is determined whether the user is using a smartphone app in a predefined manner to indicate that control of the motor vehicle can be assumed at any time, for example, to stop the vehicle, in the simplest case, through a corresponding actuation within the app. The parking assistance system therefore searches for a parking space only under the condition that a human is able to intervene, for example, as a reserve or backup system. When searching for a parking space on public roads, this may be particularly important because it significantly reduces the risk that a collision will occur due to an error by the parking assistance system.

In some examples, when a suitable parking space has been detected, the parking assistance system may drive the motor vehicle into this parking space under the condition that a person can assume control of the motor vehicle. It can also be checked at this point whether a driver is sitting in the driver's seat and ready to assume control, for example, by checking whether the driver's hands are on the steering wheel. By way of example, the approach described above with regard to a smartphone app can also be used in this case. The parking assistance system therefore only parks the motor vehicle autonomously in a parking space found to be suitable if a human is available as a reserve or backup system that can assume control of the motor vehicle if necessary. This increases the safety during automatic parking.

In some examples, the parking assistance system may search in a fully autonomous mode for a parking space, without the need for a person who can assume control of the motor vehicle, when the motor vehicle is in a predefined area, in particular in a parking lot or a parking garage. In other words, in a defined area, for example, a parking lot for a department store, etc., the parking assistance system can independently search for a parking space simply by driving down a row of parked vehicles, without the need for a person serving as a reserve or backup system. By way of example, a driver can exit the motor vehicle, leaving the parking assistance system to search for a parking space fully autonomously, without the driver having to sit in the vehicle, ready to assume control. When not on streets, preferably in enclosed parking garages or parking lots, the parking assistance system can therefore search for a parking space fully autonomously, which is particularly convenient for a driver of the motor vehicle, because it is not necessary for the driver to monitor the search for a parking space.

When a suitable parking space for the motor vehicle has been detected in a predefined area, for example, a parking lot or a parking garage, the parking assistance system may drive the motor vehicle fully autonomously into the parking space without the need for a person who can assume control of the motor vehicle. If, in some examples, a suitable parking space is found during the fully autonomous search for a parking space, the parking assistance system can then fully autonomously maneuver the motor vehicle into the parking space, without the need for a driver in the vehicle, or for a driver to go to the vehicle. As a result, the parking assistance system can also select particularly narrow parking spaces as suitable, because a driver no longer has to get out of the vehicle. The driver can leave the motor vehicle prior to the fully automatic parking procedure. This means that existing parking areas can be used particularly effectively, because the relevant motor vehicle can also be parked in very narrow parking spaces, since it is not necessary to open any doors afterward.

A parking assistance system according to the present disclosure for motor vehicle may be configured to search for a parking space in that the longitudinal and transverse control of the motor vehicle takes at least one property of a detection device in the motor vehicle that is configured to scan the vehicle's environment into account. The parking assistance system may also be configured to survey parking spaces on the basis of a vehicle's environment scanned by the detection device, and based on the surveyed parking space, to determine whether a parking space suitable for the motor vehicle has been detected.

The motor vehicle according to the present disclosure comprises the parking assistance system, and/or a detection device that is configured to scan a vehicle environment.

A motor vehicle 1 is shown in a schematic illustration in FIG. 1 that includes a parking assistance system 2 and a detection device 3 for scanning an environment. The parking assistance system 2 may be configured to assume longitudinal and transverse control of the motor vehicle while searching automatically for a parking space. The detection device 3 can contain a series of sensors, not shown in detail, by means of which the vehicle's environment can be scanned. The sensors can be installed at different locations on the motor vehicle 1. As such, the motor vehicle 1 can contain numerous cameras, ultrasonic sensors, or radar sensors, by means of which the vehicle's environment can be scanned.

Figure 2:
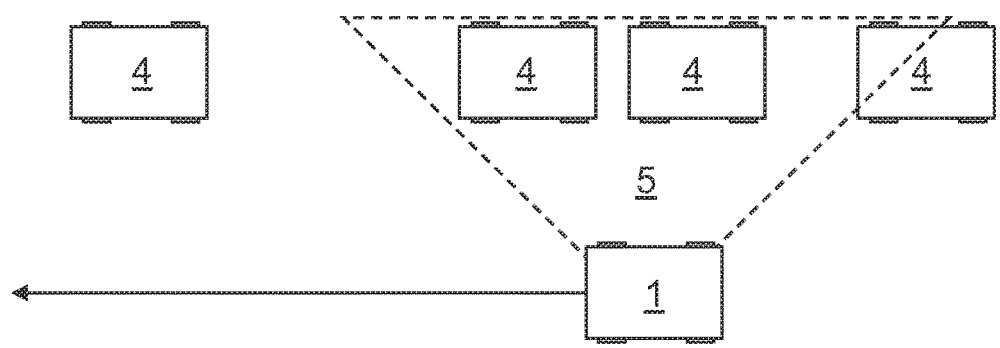
FIG. 2 shows an exemplary schematic illustration of the motor vehicle while it is searching for a parking space, during which it drives along a row of parked motor vehicles.

The motor vehicle 1 is shown in another schematic illustration in FIG. 2, during which the parking assistance system 2 assumes longitudinal and transverse control of the motor vehicle 1 in order to search for a parking space. In the present, schematically illustrated example, a series of other motor vehicles 4 are parked end to end in a row. By way of example, the motor vehicle 1 can search for a parking space along a street on which the other motor vehicles 4 are parked at the side.

In one example, the parking assistance system 2 in the motor vehicle 1 searches for a parking space, in that it assumes longitudinal and transverse control of the motor vehicle 1, taking at least one property of the detection device 3 in the motor vehicle 1 into account. By way of example, the motor vehicle 1 may have a variety of sensors on the longitudinal side thereof, for example, ultrasonic sensors, or one or more cameras, wherein one of the cameras can be located in a lower region on a side mirror, for example. Information or data regarding the detection range of the respective sensors in the detection device 3 used for scanning the environment is provided to the parking assistance system 2. The longitudinal and transverse control of the motor vehicle 1 during the search for a parking space is therefore dependent on a detection range of the detection device 3. The longitudinal and transverse control of the motor vehicle 1 is therefore such that a maximum distance to other motor vehicles 4 and/or other obstacles (not shown) which is predefined on the basis of the detection range 5 off the detection device 3, is not exceeded. This may ensure that the relevant sensors in the detection device 3 are able to scan the vehicle's environment at the side of the motor vehicle 1 well enough that various gaps and parking spaces can be surveyed by the parking assistance system 2. The longitudinal and transverse control of the motor vehicle 1 can also be such that a minimum distance to the motor vehicles 4 and/or other obstacles, predefined on the basis of the detection range 5, is maintained. It may be the case that certain sensors or cameras in the detection device 3 no longer deliver meaningful or useful results that would enable a surveying and detection of suitable parking spaces, when they are closer than a minimum distance to other objects. Because this predefined minimum distance to other motor vehicles 4 or other obstacles is maintained when steering the motor vehicle 1, it can be ensured that the relevant sensors or cameras in the detection device 3 deliver meaningful and useful results for the search for a parking space. In addition, the minimum distance can also be determined for safety reasons, such that a more meaningful minimum distance to the motor vehicles 4 or other obstacles is maintained. The parking assistance system 2 can therefore control the motor vehicle 1 such that even if a door on one of the motor vehicles 4 is opened suddenly, there is still enough space that the motor vehicle 1 will not hit it.

In some examples, the longitudinal and transverse control of the motor vehicle 1 by the parking assistance system 2 can be such that the detection device 3 is configured with an optimal field of vision for scanning the parking spaces that are to be surveyed. Information or data can be provided for this, for example, regarding the locations of relevant sensors or cameras in the detection device 3, and the perspective from which these can scan the vehicle's environment. Taking this data or information into account, the parking assistance system 3 can influence the longitudinal and transverse control of the motor vehicle 1 such the optimal results are obtained regarding the detection of vehicle's environment, making it possible to survey potential parking spaces and decide on the basis thereof whether a parking space suitable for the motor vehicle 1 has been found.

It may be the case that the parking assistance system 2 searches for the parking space under the condition that a person can assume control of the motor vehicle 1. By way of example, it is checked whether a driver is sitting in the motor vehicle 1 and the driver's hands, for example, are on the steering wheel. If these conditions are satisfied, the parking assistance system assumes automatic longitudinal and transverse control of the motor vehicle 1 in the automatic search for a parking space. As soon as it has been determined that the relevant person, i.e. the driver, can no longer assume control of the motor vehicle 1, the automatic search for a parking space is stopped. In this case, it may be provided that an acoustic and/or optical message is issued in the vehicle interior that requests the driver to be able to reassume control of the motor vehicle 1. As soon as this is the case, the automatic search for a parking space can be resumed.

If an appropriate parking space for the motor vehicle 1 is detected, the parking assistance system 2 may then drive the motor vehicle 1 into this parking space, for example, under the condition that the driver can assume control of the motor vehicle 1. This ensures that the driver can also assume control of the motor vehicle 1, if needed, as a backup, during a parking procedure. It makes particular sense on public streets, for example, for the parking assistance system 2 to only be able to search for a parking space and/or automatically park if a person can also assume control of the motor vehicle 1.

If, instead, the motor vehicle 1 is in a parking garage or an enclosed parking lot for a supermarket, etc. the parking assistance system 2 can fully autonomously search for a parking space and carry out the parking procedure, without a person, in particular a driver, being able to assume control of the motor vehicle 1. In this case, a driver can first get out of the motor vehicle 1, for example, after which the parking assistance system 2 searches fully autonomously for a parking space, and if a parking space is found, fully autonomously parks the motor vehicle 1.

The parking assistance system 2 may also assume longitudinal and transverse control of the motor vehicle 1 during the search for a parking space on the basis of a permanently recorded vehicle environment, such that the other motor vehicles 4 or other obstacles, not shown, are detected and avoided as needed, or the motor vehicle 1 is stopped. By way of example, it may be the case that one of the motor vehicles 4 starts to pull out of a parking space during the search for a parking space. Based on the recording of the vehicle environment, the detection device 3 in the motor vehicle 1 can detect that a motor vehicle 4 has just begun to pull out of a parking space. In this case, the parking assistance system 2 can control the motor vehicle 1 such that it undertakes an avoidance maneuver, thus preventing a collision with the other motor vehicle 4, for example. It is also possible for the parking assistance system to actuate the brakes in the motor vehicle 1, stopping it until the other motor vehicle 4, just leaving its parking space, has finished leaving the parking space and driven off. This second option may make particular sense because the parking space the other motor vehicle 4 has just pulled out of may then represent a potential parking space for the motor vehicle 1.

In the method and parking assistance system 2 described above, various properties of the detection device 3 and the relevant sensors can be taken into account during the search for a parking space. This makes it possible to obtain particularly good results using sensor and/or camera results that can be used for finding and surveying suitable parking spaces. A driver of the motor vehicle 1 does not need to be concerned with how the motor vehicle 1 must move during the search for a parking space, such that the relevant sensors or cameras in the detection device 3 can also deliver those results that are good enough for surveying parking spaces and for deciding whether the surveyed parking spaces are suitable for the motor vehicle 1. Moreover, the driver can pay more attention to the environment during the automatic search for a parking space, because he is not by searching for parking spaces and controlling the motor vehicle 1 such that the detection device 3 can also deliver sufficient data for surveying and identifying suitable parking spaces. Because the parking assistance system 2 can also control the motor vehicle 1 such that collisions with other objects are avoided, minor dents and scratches can also be prevented during the search for a parking space. The approach and the parking assistance system 2 described herein result in a particularly good parking on the whole, because potential parking spaces can be surveyed in a particularly reliable manner, and suitable parking spaces for the motor vehicle 1 can be identified.

LIST OF REFERENCE SYMBOLS

1 motor vehicle
2 parking assistance system
3 detection device
4 other motor vehicles
5 detection range of the detection device

The invention claimed is:

1. A method for operating a parking assistance system in a motor vehicle, comprising:
   detecting environment data in the area of the motor vehicle via a detection device;
   searching for a potential parking space via the parking assistance system using the detected environment data, wherein longitudinal and transverse control of the motor vehicle is determined by the parking assistance system based on the detected environment data;

detecting further environment data in the area of the motor vehicle via the detection device during the searching for the potential parking space;

surveying parking spaces in an area of the potential parking space via the parking assistance system on the basis of the further environment data; and determining a valid parking space for the motor vehicle on the basis of the surveyed parking spaces.

2. The method according to claim 1, wherein the longitudinal and transverse control of the motor vehicle is dependent on a detection range of the detection device.

3. The method according to claim 2, wherein the longitudinal and transverse control of the motor vehicle is configured such that a maximum distance to other vehicles and/or obstacles, which is predefined on the basis of the detection range, is not exceeded.

4. The method according to claim 2, wherein the longitudinal and transverse control of the motor vehicle is configured such that a minimum distance to other vehicles and/or obstacles, which is predefined on the basis of the detection range, is maintained.

5. The method according to claim 1, wherein the longitudinal and transverse control of the motor vehicle is configured such that an optimal field of vision is determined for the detection device for scanning the parking spaces that are to be surveyed.

6. The method according to claim 1, further comprising detecting other vehicles and/or obstacles on the basis of the further environment data, wherein the longitudinal and transverse control is configured such that the detected other vehicles and/or obstacles are avoided.

7. The method according to claim 1, wherein the further environment data comprises a scanned vehicle environment via at least one of a (i) camera, (ii) ultrasonic sensor, and/or (iii) radar sensor in the detection device.

8. The method according to claim 1, wherein the searching for the potential parking space occurs under the condition that the motor vehicle may be manually controlled by a driver.

9. The method according to claim 1, further comprising driving the motor vehicle, via the parking assistance system, into the valid parking space under the condition that the motor vehicle may be manually controlled by a driver.

10. The method according to claim 1, further comprising determining the motor vehicle is in a predefined area, wherein the surveying parking spaces via the parking assistance system occurs fully autonomously.

11. The method according to claim 1, further comprising driving the motor vehicle fully autonomously into the determined valid parking space for the motor vehicle.

12. A system for operating a parking assistance system in a motor vehicle, comprising:
a detection device; and
a parking assistance system, wherein the detection device and parking assistance system are configured to:
detect environment data in the area of the motor vehicle via the detection device;
search for a potential parking space via the parking assistance system using the detected environment data, wherein longitudinal and transverse control of the motor vehicle is determined by the parking assistance system based on the detected environment data;
detect further environment data in the area of the motor vehicle via the detection device during the searching for the potential parking space;
survey parking spaces in an area of the potential parking space via the parking assistance system on the basis of the further environment data; and
determine a valid parking space for the motor vehicle on the basis of the surveyed parking spaces.

13. The system according to claim 12, wherein the longitudinal and transverse control of the motor vehicle is dependent on a detection range of the detection device.

14. The system according to claim 13, wherein the longitudinal and transverse control of the motor vehicle is configured such that a maximum distance to other vehicles and/or obstacles, which is predefined on the basis of the detection range, is not exceeded.

15. The system according to claim 13, wherein the longitudinal and transverse control of the motor vehicle is configured such that a minimum distance to other vehicles and/or obstacles, which is predefined on the basis of the detection range, is maintained.

16. The system according to claim 12, wherein the longitudinal and transverse control of the motor vehicle is configured such that an optimal field of vision is determined for the detection device for scanning the parking spaces that are to be surveyed.

17. The system according to claim 12, wherein the detection device and parking assistance system are configured to detect other vehicles and/or obstacles on the basis of the further environment data, wherein the longitudinal and transverse control is configured such that the detected other vehicles and/or obstacles are avoided.

18. The system according to claim 12, wherein the further environment data comprises a scanned vehicle environment via at least one of a (i) camera, (ii) ultrasonic sensor, and/or (iii) radar sensor in the detection device.

19. The system according to claim 12, wherein the detection device and parking assistance system are configured to search for the potential parking space under the condition that the motor vehicle may be manually controlled by a driver.

20. The system according to claim 12, wherein the parking assistance system is configured to drive the motor vehicle into the valid parking space under the condition that the motor vehicle may be manually controlled by a driver.

* * * * *